United States Patent
Morris et al.

(10) Patent No.: US 6,822,763 B2
(45) Date of Patent: Nov. 23, 2004

(54) MULTIPLE FUNCTION CALIBRATION FOR DOCUMENT SCANNER

(75) Inventors: Daniel L. Morris, Webster, NY (US); Christopher J. Spencer, Shotrsville, NY (US); Michael J. Poirier, Rochester, NY (US); Timothy G. Shelhart, West Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 916 days.

(21) Appl. No.: 09/745,139

(22) Filed: Dec. 20, 2000

(65) Prior Publication Data

US 2002/0075528 A1 Jun. 20, 2002

(51) Int. Cl.⁷ .............................................. H04N 2/100
(52) U.S. Cl. ....................... 358/406; 358/408; 358/496; 358/498; 358/504; 271/162; 271/230
(58) Field of Search ................................ 358/406, 408, 358/453, 498, 497, 496, 504; 271/162–164, 230, 241

(56) References Cited

U.S. PATENT DOCUMENTS

| | | | | |
|---|---|---|---|---|
| 4,933,778 A | * | 6/1990 | Tufano et al. ............... | 358/488 |
| 5,881,166 A | | 3/1999 | Farrell ......................... | 382/168 |
| 6,012,714 A | * | 1/2000 | Worley et al. ............. | 271/3.14 |
| 6,022,012 A | * | 2/2000 | Worley ....................... | 271/3.14 |
| 6,043,900 A | | 3/2000 | Feng et al. ................... | 358/1.9 |
| 6,046,828 A | * | 4/2000 | Feng et al. ................. | 358/488 |
| 6,353,486 B1 | * | 3/2002 | Tsai ........................... | 358/474 |
| 6,687,024 B1 | * | 2/2004 | Short et al. ................. | 358/474 |

* cited by examiner

Primary Examiner—Kimberly A. Williams
Assistant Examiner—Negussie Worku
(74) Attorney, Agent, or Firm—David J. Arthur (57) ABSTRACT

A compact structure and rapid method for calibrating a document scanner provides for a substantially cylindrical calibration casing having a central axis and an outer surface, with a brightness calibration section of the outer surface encompassing a portion of the circumference of the outer surface, a document width detection segment encompassing a second portion of the circumference of the outer surface, and a document backer element encompassing a third segment of the circumference of the outer surface of the casing. A driver selectively positions the casing in different rotational positions in which the different segments of the outer surface of the cylinder face the optical element of the scanner.

23 Claims, 7 Drawing Sheets

MULTIPLE FUNCTION CALIBRATION FOR DOCUMENT SCANNER

The present invention relates generally to document scanners, and more particularly to setting the scanner to calibrate the imaging elements of the scanner. In further particularity, the invention relates to scanners for large format documents, such as engineering drawings, that are scanned by moving the document past the imaging element of the scanner.

A document scanner receives light reflected from a document to convert the image on the document into a format for further processing. For example, an analog light lens scanner uses a lens to project the image onto an apparatus such as a photoreceptor to reproduce the document image through electrostatic printing. Scanners may also use digital photosensors that convert the light reflected from the document into digital electronic information. A lens may focus the document image onto the digital photosensors. Alternatively, a linear array of photosensors may extend across the entire width of the document to be scanned. The linear array of photosensors may be moved along the document, or the document may be moved past the linear array of photosensors. In certain instances, it may be possible to scan the document using digital photosensors that move in a raster format, moving the photosensors across the document in a predetermined pattern.

The imaging apparatus, whether a photoreceptor, or an array of digital photosensors (with or without a focusing lens) should be calibrated for maximum performance of the scanner in creating a faithful image or reproduction of the document. Such calibration may include ascertaining the maximum amount of light that may be received by the optical element, determining the dimensions of the documents being scanned, and determining the nature of the background of the document to be scanned.

SUMMARY OF THE INVENTION

The present invention is a method and apparatus for calibrating a document scanner.

The calibration method of the present invention includes positioning a calibration structure in a first position in which a first portion of the calibration structure is in the field of view of the optical element of the scanner, and then scanning the first portion of the calibration structure to perform a light calibration. The method also includes the step of moving a portion of a document to be scanned into the field of view of the scanner optical element, and positioning the calibration structure in a second position in which a second portion of the calibration structure is in the field of view of the optic element, and the document is in the optical path between the optical element and the second portion of the calibration structure, and then determining the width of the document. The method further includes positioning the calibration structure in a third position in which a third portion of the calibration structure is in the field of view of the optical element.

A calibration apparatus in accordance with the invention includes a substantially cylindrical casing having a longitudinal central axis and an outer surface. A first portion of the outer surface encompasses a first segment of the circumference of the outer surface, and is white. A second portion of the outer surfaces encompasses a second segment of the circumference of the outer surface of the casing, and is black. A document backer comprises a longitudinal slot through the outer surface of the casing, encompassing a third segment of the circumference of the outer surface of the casing, and a backer roller positioned in the slot. A driver is connected to the casing for selectively positioning the casing in first, second, or third rotational positions in which the first, second, or third portions of the outer surface of the cylindrical casing, respectively, face in a first direction.

A document scanner in accordance with the present invention includes an optical element that has a field of view, and a document transport mechanism for moving a document in a first direction past the optical element. The scanner additionally includes a calibration casing having an outer surface, wherein a first portion of the outer surface is a first color, and a second portion of the outer surface is a second color, contrasting with the first color. A driver is operatively connected to the casing to selectively position the first or second portion of the outer surface of the casing in the field of view of the optical element.

DETAILED DESCRIPTION OF A PREFERRED EMBODIMENT

Figure 1:
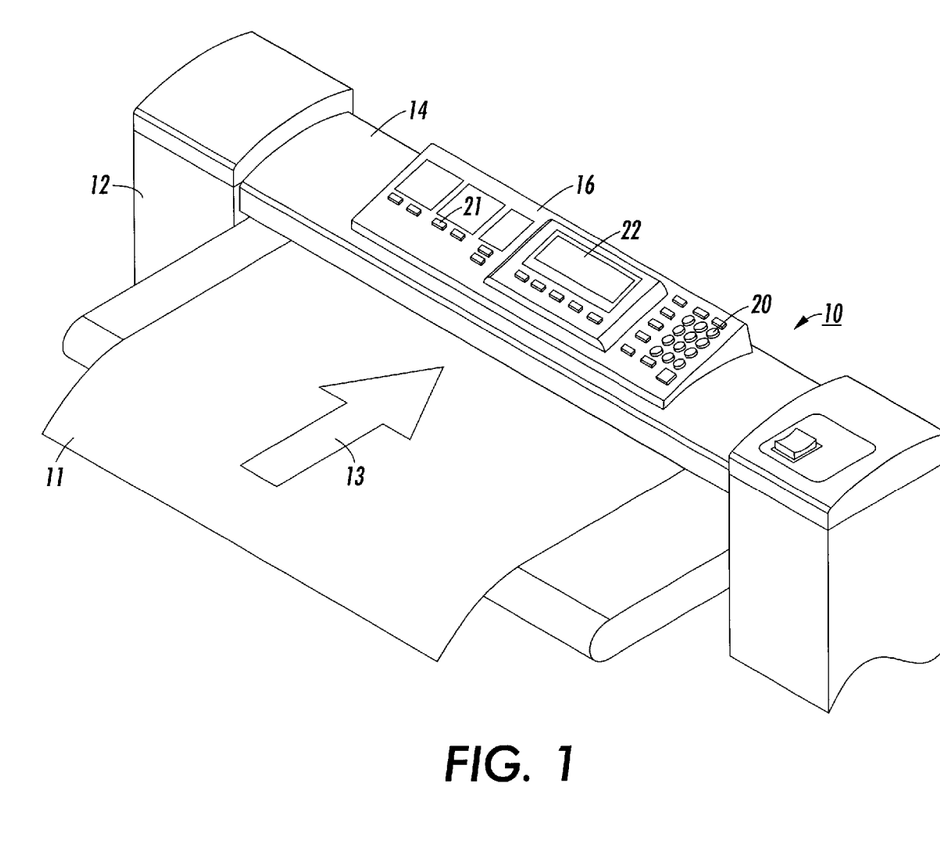
FIG. 1 is a perspective view of a document scanner incorporating the present invention.

For example, the housing may include a lens that focuses an image onto an array of photosensors, or may include an array of photosensors that receives the image directly. The optical element remains stationary within the housing during a scanning operation, and the document 11 is transported in a first direction along a document path over the top of the housing 12, to draw the document past the optical element. A removable cover 14 encloses the document path. Other implementations may include moving optical elements. A user interface module 16 on the cover provides information about the status of the scanner, and instructions for use. The user interface module 16 may include a keypad 20, control buttons 23, and/or a display screen 22, which screen may be touch sensitive. The detailed construction and features of the user interface module 16 depend on the specific functions and capabilities of the scanner. Also, the user interface module may be in other positions, including on another portion of the housing, or separated from the other elements of the scanner.

Figure 2:
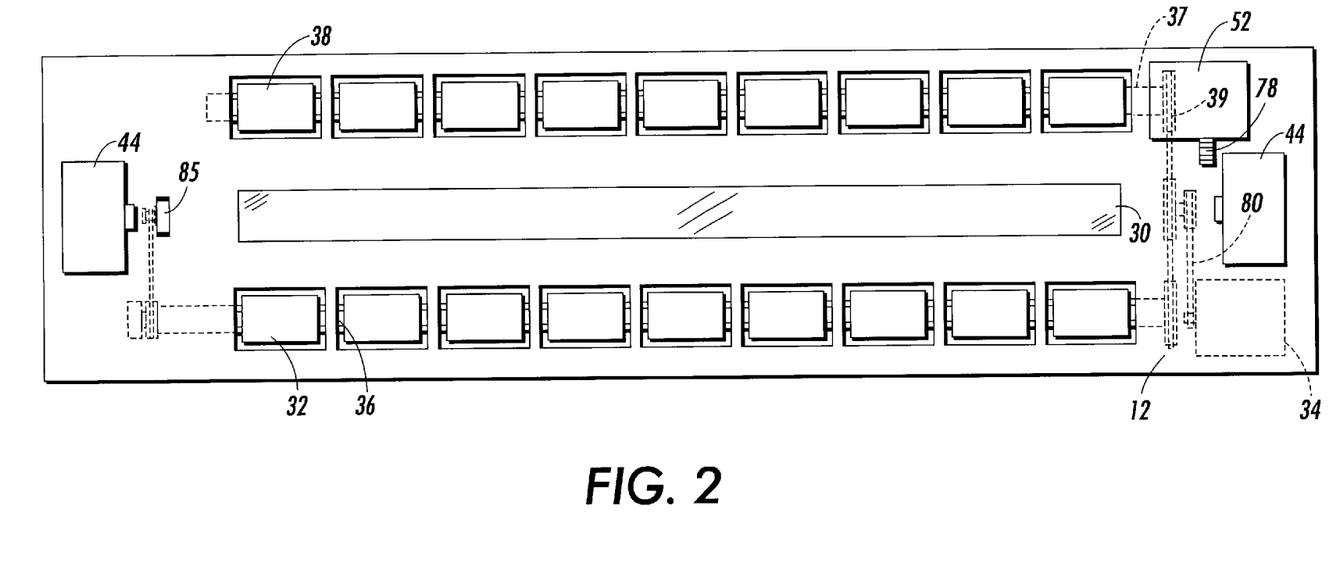
FIG. 2 is a top view of the scanner of FIG. 1, with the top cover, user interface panel, and calibration element removed.

Referring next to FIG. 2, the top of the housing is shown with the cover 14 and user interface module 16 removed. In the particular embodiment illustrated, the optical element is a linear array of photosensors 30 positioned so that when a document 11 (FIG. 1) is placed in the document path, the document 11 is at the focal point of each of the photosensors.

The array of photosensors 30 extends across the width of the widest document to be scanned by the scanner. The document path and the array of photosensors is, for example, 36 inches (91.4 cm) wide. One particular mechanism for assembling such a wide array of photosensors from smaller arrays is described in pending U.S. patent application Ser. No. 09/677,742, filed Oct. 3, 2000, entitled "Assembly Of Imaging Arrays For Large Format Documents", by inventor Kraig A. Quinn. The linear array of photosensors has a field of view that is one pixel in the direction of document travel, and extends across the width of the document to be scanned. As will be understood by those familiar with the art, the photosensors convert successive pixel wide lines of the document into digital information that can be converted into a representation of the image on the document. Those skilled in the art will recognize that other types of optical structures can be used, including one or more lenses that focus the document image on a smaller array of photosensors, or an optical lens to focus the image on a photoreceptor or other structure.

A document transport mechanism includes leading document transport rollers 32 on the leading side of the optical element 30 to draw a document 11 (FIG. 1) in a first direction 13 along a document path into the scanner, and past the field of view of the optical element 30. A transport motor 34, such as a stepper motor, is operatively connected to the transport rollers 32 to rotate the transport rollers. For example, the transport rollers may be connected to a common axle 36 that is driven by the transport motor 34. Trailing transport rollers 38 on a common axle 37 may be on the trailing side of the optical element. These trailing transport rollers 38 may be freewheeling, or they may also be driven by the transport motor 34. In the illustrated embodiment, the transport motor 34 is connected to the leading roller axle 36 the trailing roller axle 37 by a pulley 39. Those familiar with the art will recognize the cover 14 has a structure such as backing rollers (not shown) that match the transport rollers 32, 38 to provide the necessary frictional force between the transport rollers 32, 38 and a document 11 (FIG. 1).

Figure 3:
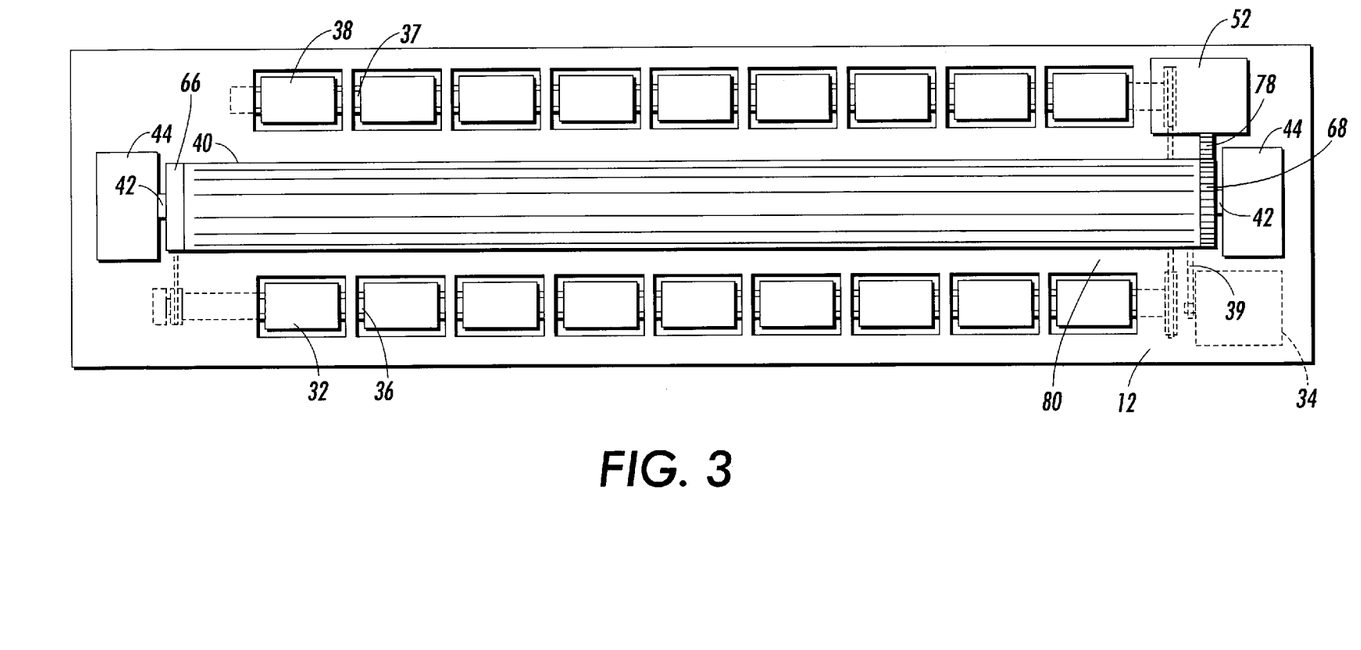
FIG. 3 is another top view of the scanner of FIG. 1, with the calibration element in position.

Referring next to FIG. 3, the housing of the scanner is shown with a calibration apparatus 40 in accordance with an aspect of the present invention installed. The calibration apparatus 40 is a substantially cylindrical casing having a central axis. An axle coincides with the axis, and has its two ends 42 mounted in an opposed pair of axle mounts 44 on the housing 12. The axle mounts 44 are positioned outside the ends of the optical element 30, so that the axis of the calibration casing is aligned directly above the optical element 30. The axle of the calibration apparatus 40 may consist of a pair of axle ends 42 at the ends of the casing, rather than a continuous element along the entire length of the casing. The axis of the calibration apparatus 40 is perpendicular to the direction 13 of the document path.

The calibration apparatus can be rotated about its central axis to present different portions of the outer surface of the calibration apparatus to the optical element 30 (FIG. 2). A driver 52, such as a stepper motor (FIG. 3) is connected to the calibration apparatus by gears, a drive belt or other mechanism to provide such rotational movement.

Figure 4:
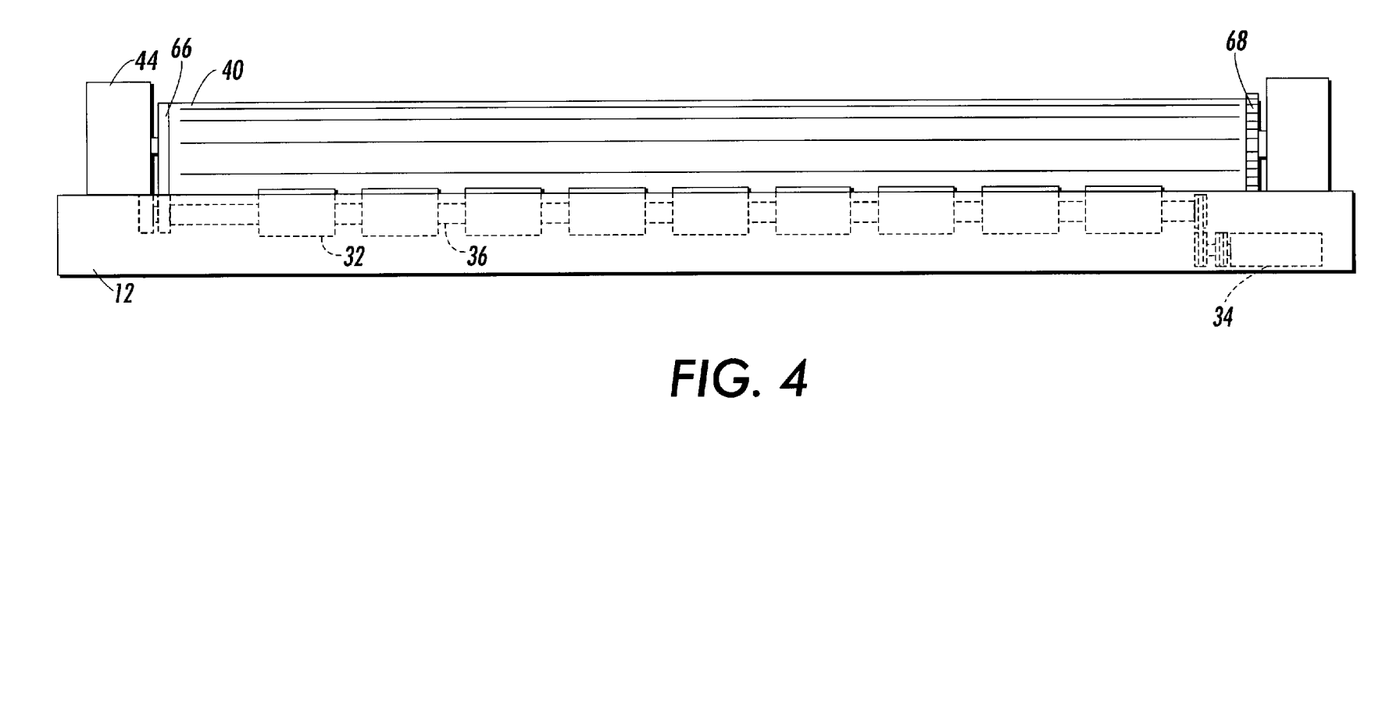
FIG. 4 is a front view of a scanner incorporating the present invention, with the cover and user interface panel removed.

Referring next to FIG. 4, a front view of the scanner (with the cover 14 removed) shows the cylindrical calibration apparatus 40 positioned on the axle mounts 44. As is apparent from FIG. 4, the transport rollers 32 are positioned to draw a document to be scanned beneath the calibration apparatus 40.

Figure 5:
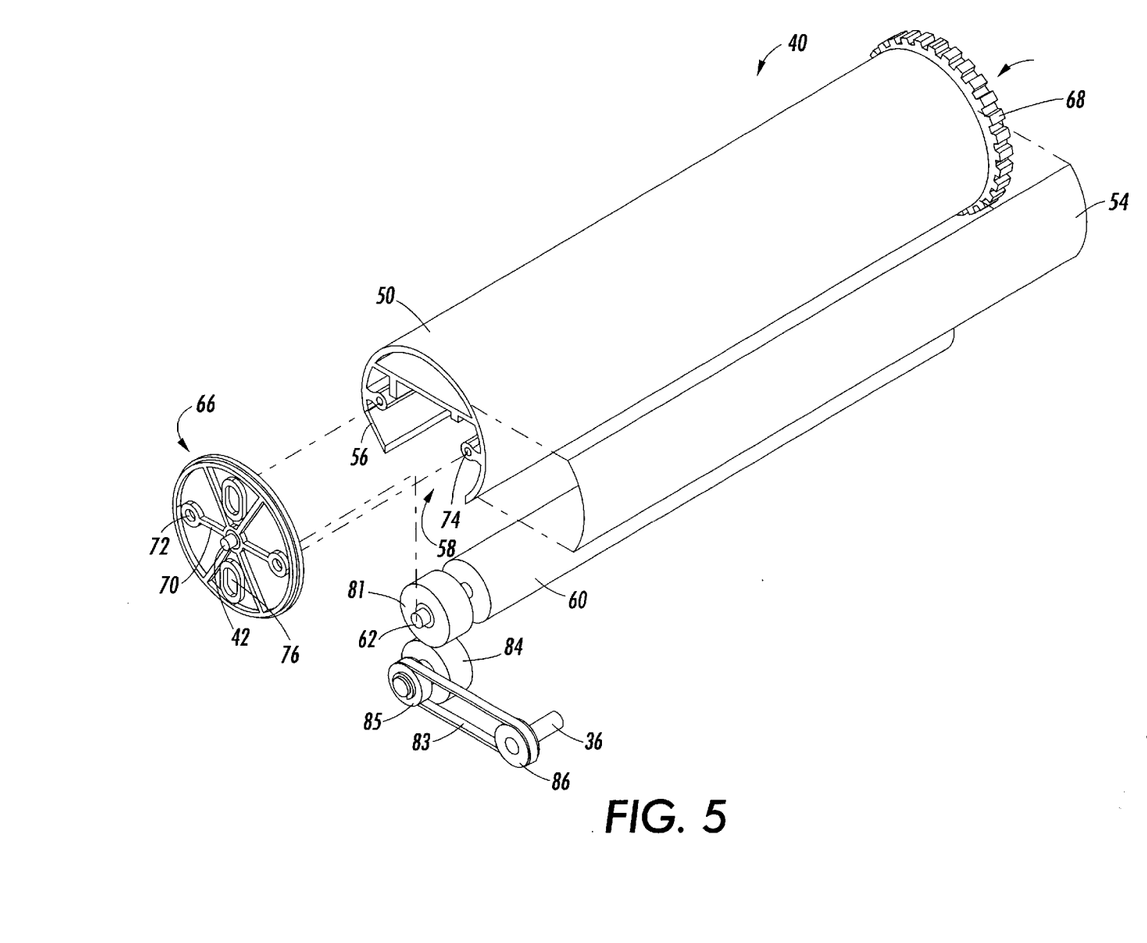
FIG. 5 is an exploded view of a calibration cylinder in accordance with the present invention.

An exploded view of a particular implementation of the calibration apparatus 40 incorporating an aspect of the present invention is shown in FIG. 5. The calibration apparatus includes a substantially cylindrical casing 50 having a longitudinal axis. The casing 50 may be formed of extruded aluminum or plastic, or of molded metal, plastic, or other materials. Extruded aluminum provides a high degree of precision for the casing 50. The length of the casing may be the same as, or slightly greater than the width of the document path. For example, for a scanner with a 36 inch (91.4 cm) wide document path, the casing may be 36 to 37 inches (91.4 to 94.0 cm) long. The casing diameter may be 2 to 5 inches (5.1 to 12.7 cm).

Referring again to FIG. 5, a first portion of the outer surface of the calibration casing 50 forms a light receptivity calibration area 54. The light receptivity calibration area permits the scanner to calibrate the light receptivity of the optical element. The white calibration area encompasses a segment of the circumference of the outer surface of the cylinder with a known, highly uniform color, such as white. A strip of highly uniform, white material may be applied to the outer surface of the casing with adhesive, or other attachment materials. Preferably, the white calibration area has a length along the length of the casing 50 substantially equal to or slightly larger than the longitudinal field of view of the optical element, and a width about the circumference of the casing somewhat larger than the field of view of the optical element in the document transport direction. For example, the white calibration area 54 may extend along the entire length of the casing 50, and may be one half inch to one inch in width about the circumference of the casing.

A second portion 56 of the outer surface of the calibration casing 50 encompasses another section of the circumference of the outer surface. The second portion 56 is a contrasting color to the color of the white light receptivity calibration area. This second portion 56 of the casing surface forms a document width detection area. For example, the second portion of the outer surface of the calibration apparatus may be black. In a particular embodiment, the entire casing 50 is powder coated in black pigment, including the width detection portion 56 of the calibration casing. Preferably, the width detection portion 56 of the calibration casing is slightly recessed from a truly cylindrical shape. For example, the width detection portion 56 may be a flattened segment of the outer surface of the otherwise cylindrical calibration casing 50.

A third portion of the calibration casing provides a document backer for holding a document being scanned tight and in position at the focal point of the optical element 30 (FIG. 2). In the illustrated embodiment, the backer element includes a longitudinal slot 58 in the outer surface of the calibration casing 50. This slot 58 extends along the entire length of the calibration casing. A backer roller 60 has a diameter smaller than the diameter of the calibration casing 50. The backer roller 60 fits inside the calibration casing so that the longitudinal axis of the backer roller 60 is substantially parallel to, but offset from, the axis of the calibration casing 50. The outer surface of the backer roller 60 is uniform in color, preferably white, so that the backer roller does not interfere with the images on transparent documents that are scanned by the scanner. The backer roll may be formed of aluminum and uniformly powder coated with white pigment. The backer roller 60 has a central axle 62. The axle may be continuous through the length of the backer roller, or may consist of two axle ends.

A pair of end caps 66, 68 are secured to the ends of the calibration casing 50. In the illustrated embodiment, the end caps 66, 68 are substantially circular in shape, and have substantially the same diameter as the diameter of the cylindrical casing 50. The end caps include the central axle ends 42 for the calibration apparatus 40, and radial spokes 70. Two of the spokes may contain screw openings 72 that may be aligned with openings 74 on the interior of the calibration casing to receive mounting screws (not shown) that attach the end caps 66, 68 to the calibration casing 50. In the illustration of FIG. 5, the right end cap 68 is shown attached to the casing. The perimeter of the right end cap 68 is toothed to engage the drive mechanism 52 rotating the casing 50 about its longitudinal axis.

Each end cap also includes an elongate slot 76 having its long dimension along a radius of the end cap. The slot 76 receives an end of the axle 62 of the backer roll. The elongate shape of the slot allows the axle of the backer roll to move in a radial direction with respect to the calibration casing 50.

Figure 6:
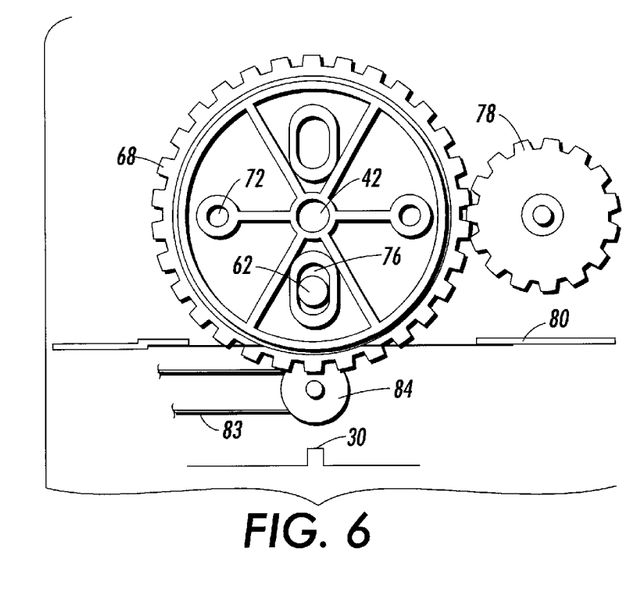
FIG. 6 is a right end view of the assembled calibration cylinder of FIG. 5.

FIG. 6 shows a right end view of the calibration apparatus with the end cap 68 on, together with a drive gear 78 from the stepper motor 52 on the scanner housing (FIGS. 2 and 3). The exemplary drive gear illustrated is a circular toothed gear, the teeth of which match the teeth on the perimeter of the end cap 58. As the stepper motor 52 (FIGS. 2 and 3) rotates the drive gear 78, the drive gear 78 engages the end cap 68 and rotates the calibration element 40 to selectively place the light receptiveness calibration strip 54, the width detection calibration strip 56, or the backer element 60 (FIG. 5) facing in a direction to be viewed by the optical element 30 of the scanner (FIG. 2). The calibration apparatus is shown in FIG. 6 with the document backer element 60 facing downward, toward the optical element 30. The axle end 62 of the backer roll is visible in the elongate slot 76. This is the "rest" position of the calibration apparatus, and also the position when a document is being scanned.

Also shown in FIG. 6 is a document support surface 80 formed of a portion of the top of the scanner housing 12. The document support surface 80 supports a document on either side of the field of view of the optical element 30. An opening 82 in the document support surface provides an optical path between the document and the optical element. During a document scan, the backer roll 60 holds the document tight at the focal point of the optical element. The document transport rollers 32, 38 (FIGS. 3 and 4) further help hold the document tight across the opening. The elongate slots 76 holding the ends of the axle 62 of the backer roller 60 permit the backer roller to move radially with respect to the calibration cylinder, so that the scanner can accommodate documents of different thicknesses. As a thicker document passes under the backer roller, the document pushes the backer roller towards the center of the calibration cylinder. The backer roller 60 may be weighted, so that it continues to assist in holding the document taut.

Figure 7:
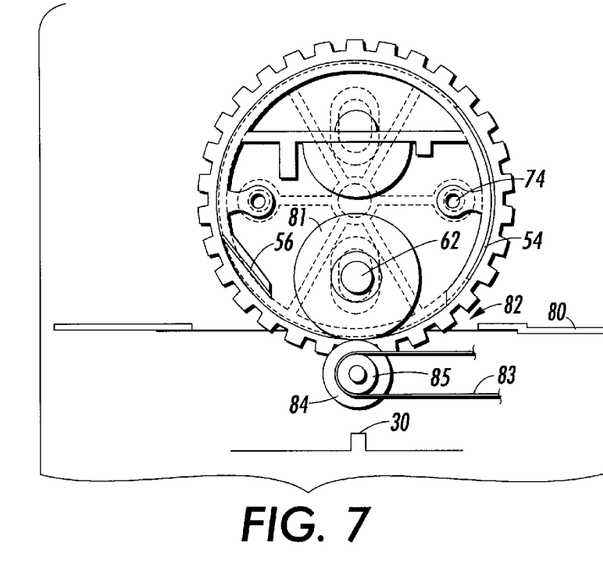
FIG. 7 is a left end view of the assembled calibration cylinder of FIG. 5.
Figure 8:
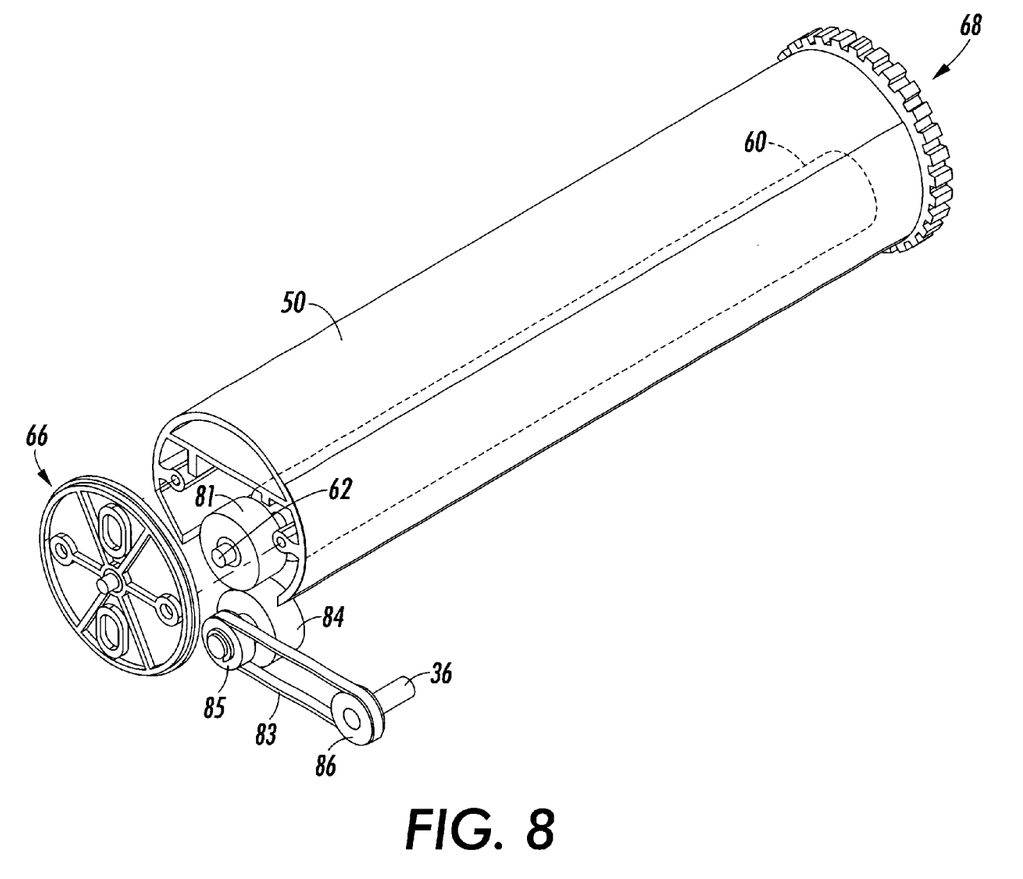
FIG. 8 is an enlarged top view of a portion of the scanner of FIG. 1, with the cover and user interface panel removed.

The teeth of the right end cap 68 are visible in FIG. 7, although they are at the far end of the cylinder. Referring next to FIGS. 5 and 8, at the end of the backer roller 60 a friction wheel 81 engages a drive wheel 84. The drive wheel is driven by the transport motor 34. Such a connection allows the transport motor 34 to rotate the backer roller 60 at the same time it rotates the document transport rollers 32. For example, a pulley 83, such as an o-ring, connecting a pulley wheel 86, the axle 36 of the leading transport rollers 32 (FIGS. 2 and 3) rotates the pulley wheel 85 and thus the drive wheel 84. The drive wheel 84 then frictionally engages the friction wheel 81 of the backer roller 60. The outer diameters of the pulley wheel 84, the drive wheel 85 and the friction wheel 81 are sized relative to the diameter of the backer roller so that as the motor 34 rotates the transport rollers 32, 38 to transport the document a particular rate, the backer roller 60 is rotated at a speed such that the surface of the backer roller moves with the document at exactly the same rate. In that way, the backer roller 60 tends to neither accelerate nor impede the progress of the document past the optical element 30. In lieu of the separate friction wheel 81 on the backer roller, the backer roller itself may frictionally engage the drive wheel 84. Alternatively, the friction wheel 81 may be positioned outside the end cap 66. The portion of the backer rollers axle 62 between the backer roller 60 and the friction wheel 81 passes through the elongate slot 76. Also, it will be apparent that the drive mechanism for the backer roller may be placed at the right end of the calibration apparatus, and the drive mechanism for the document feed rollers may be placed on the left end of the scanner. Although the drive mechanisms are shown on opposite ends of the scanner, they may also be placed on the same end.

Performing multiple function calibration in accordance with an aspect of the present invention may be accomplished quickly, and may be repeated at particular intervals. For example, the various aspects of the calibration may be performed on a hourly, daily, weekly, or monthly basis, or may be performed after a particular number of scans, such as every ten scans, or even every scan. For example, the steps of the calibration process may be performed each time a document 11 is inserted into the scanner for scanning. A registration sensor (not shown) in the document path senses the presence of a document. Such registration sensors are well known and understood by those familiar with the art. The structure described above by rotating about a fixed axis on the axle ends 42 permits the multiple scanning functions to be performed by a compact apparatus, without adversely affecting the alignment of the document transport mechanisms of the scanner.

An initial light receptivity calibration is accomplished by positioning the calibration element 40 in a first position in which the light receptivity calibration area 54 faces the optical element 30 of the scanner. The receptivity of the photosensor elements of the optical element may then be calibrated in accordance with well known methodologies. The white light receptivity calibration area 54 is held at the focal point of the optical element for maximum accuracy of the calibration process. An initial light receptivity calibration is taken while holding the calibration element stationary with the white calibration area 54 in the field of view of the optical element 30. Subsequently, the stepper motor 52 slowly rotates the calibration element so that the white light receptivity calibration area moves across the field of view of the optical element. The light receptivity calibration continues as the calibration element is rotated to perform a moving calibration. If it should turn out that a spec, dot, or other non-uniformity on the light receptivity calibration area was visible to the optical element 30 during the stationary calibration, performing a moving calibration permits the calibration algorithm to compensate for that by, for example, using a moving average.

The stepper motor 52 rotates the calibration element to a second position so that the width detection portion 56 of the cylinder surface is in the field of view of, and facing the optical element. As noted above, the width detection segment is preferably slightly recessed, so that it is beyond the focal point of the optical element.

The document transport rollers transport a portion of the document to be scanned past the optical opening in the document support surface so that the document is in the field of view of the optical element, between the optical element and the calibration element.

The scanner then scans a segment of the document. Using known analysis techniques, the scanner determines the locations of the edges of the document. An extended portion of the document may be transported across the field of view of the optical element so that the scanner can confirm that the width of the document remains constant. The recessed or flattened section of the surface of the calibration cylinder allows the documents to move slightly beyond the focal plane of the optical element. With the document beyond the focal plane of the imaging optical element, the document image is out of focus. The out of focus image produces smoother image data, with few sharp lines in the image that might be mistaken for the edge of the document.

Once the width of the document has been determined, the stepper motor 52 rotates the calibration element to a third position to place the document backer element 60 in the field of view opening through the document support surface 80, facing the optical element 30. The document may then be scanned. The document backer roller 60 rotates about its axis on the axle ends 62 so the document does not bind as it moves across the document backer. In a particularly preferred embodiment, the backer roller 60 is driven by the transport motor 34, so that the backer roller rotates at the same rate as the document transport rollers. In this way, the backer roller assists in moving the document in a first direction along the document path past the optical element. Those skilled in the art will recognize that before performing a full scan of the document, a preliminary scan may be desirable so that the scanner can analyze the document background. From the preliminary scan, the scanner may identify, and compensate for, shaded or colored backgrounds. As noted above, the document backer roller 60 is preferably white, so that if the document being scanned is transparent, the backer roller does not provide interfering background for the scanner.

As the calibration apparatus moves through its positions, the central axis of the calibration element casing remains fixed on the axle ends 42, so that the alignment of the backer element is not affected by movement during the calibration process.

Those skilled in the art will recognize that variations and modifications may be made to the specific implementation described above without departing from the scope of the invention. For example, other shapes of calibration structures may be used, and the specific calibration regions on the exterior surface of the calibration apparatus may be positioned differently. In addition, different types of backers element structures may be used, as well as different types of drive elements for moving the calibration apparatus, the backer elements, and the document feed structure. Therefore, the scope of the present invention should not be limited to the specific details of the implementation described above.

We claim:

1. A method of calibrating a document scanner, wherein the scanner includes an optical element, the method comprising the steps of:
    positioning a calibration structure in a first position in which a first portion of the calibration structure is in the field of view of the optical element of the scanner;
    scanning the first portion of the calibration structure to perform a light calibration;
    placing a portion of a document in the field of view of the optical element;
    positioning the calibration structure in a second position in which a second portion of the calibration structure is in the field of view of the optical element, and the document is in the optical path between the optical element and the second portion of the calibration structure;
    determining the width of the document; and
    positioning the calibration structure in a third position in which a third portion of the calibration structure is in the field of view of the optical element, wherein the third portion of the calibration structure includes a document backer element.

2. The method of claim 1, wherein the step of positioning the calibration structure in the first position comprises positioning the calibration structure so that the first portion of the calibration structure is at the focal plane of the optical element.

3. The method of claim 1, wherein the step of scanning the first portion of the calibration structure comprises moving the calibration structure so that the first portion of the calibration structure moves through the field of view of the optical element while performing the light calibration.

4. The method of claim 3, wherein the step of moving the calibration structure so that the first portion of the calibration structure moves through the field of view of the optical element comprises rotating the calibration structure about an axis perpendicular to the document path.

5. The method of claim 1, wherein the step of determining the width of the document comprises scanning the portion of the document in the field of view of the optical element while the calibration structure is in the second position.

6. The method of claim 1, additionally comprising the step of moving the document through the document path past the optical element so that successive portions of the document pass through the field of view of the optical element at the focal plane of the optical element.

7. The method of claim 6, wherein the document backer element comprises a roller having an axis of rotation perpendicular to the document path and
    the method additionally comprises rotating the backer roller on its axis as the document is moved past the optical element.

8. The method of claim 7, additionally comprising, when the calibration structure is in the third position, adjusting the position of the document backer element to accommodate the thickness of the document.

9. The method of claim 1, wherein the steps of the method are repeated at predetermined intervals based on elapsed time.

10. The method of claim 1, wherein the steps of the method are repeated at predetermined intervals based on a number of scanning operations the scanner has performed.

11. A calibration apparatus for a document scanner, the calibration apparatus comprising:
    a substantially cylindrical casing having a longitudinal central axis and an outer surface, wherein a first portion of the outer surface encompassing a first segment of the circumference of the outer surface of the casing is white, and a second portion of the outer surface encompassing a second segment of the circumference of the outer surface of the casing is black;
    a document backer comprising a longitudinal slot through the outer surface of the casing encompassing a third segment of the circumference of the outer surface of the casing, and a backer roller positioned in the slot;
    a driver connected to the casing for selectively positioning the casing in first, second, or third rotational positions in which the first, second, or third portions of the outer surface of the cylindrical casing, respectively, face in a first direction.

12. The calibration apparatus of claim 11, wherein the second portion of the outer surface of the casing is recessed.

13. The calibration apparatus of claim 11, wherein the second portion of the outer surface of the casing is substantially flat.

14. The calibration apparatus of claim 11, wherein the backer roller comprises a cylinder having a diameter smaller than the diameter of the casing, and having a longitudinal axis substantially parallel to the axis of the casing.

15. The calibration apparatus of claim 14, wherein the outer surface of the backer roller is white.

16. The calibration apparatus of claim 14, additionally comprising first and second substantially circular end caps on the ends of the cylindrical casing, wherein the end caps support the backer roller so that the axis of the backer roller is substantially parallel to and offset from the central axis of the casing.

17. The calibration apparatus of claim 16, wherein the backer roller has axle ends at each end of the backer roller, and each end cap has an elongate slot extending along a portion of a radius of the end cap for receiving the backer roller axle ends so that the axis of the backer roller is movable in a radial direction relative to the axis of the casing.

18. The calibration apparatus of claim 17 wherein the driver is connected to the casing for selectively rotating the casing about its longitudinal central axis.

19. A document scanner comprising:

an optical element having a field of view;

a transport mechanism for moving a document and the optical element relative to one another;

a calibration casing having an outer surface, wherein a first portion of the outer surface is a first color, and a second portion of the outer surface is a second color, contrasting with the first color; and a driver operatively connected to the casing to selectively position the first or second portion of the outer surface of the casing in the field of view of the optical element.

20. The document scanner of claim 19, wherein:

the first portion encompasses a segment of the outer surface greater than the field of view of the optical element; and the driver can selectively move the casing slowly so that the first portion of the casing surface moves slowly through the field of view of the optical element.

21. The document scanner of claim 19, wherein the calibration casing additionally comprises a document backer element encompassing a third portion of the outer surface of the calibration casing, and the driver can additionally selectively position the document backer in the field of view of the optical element.

22. The document scanner of claim 21, wherein the document backer element comprises a longitudinal opening through the outer surface of the casing, and a substantially cylindrical backer roller set into the longitudinal opening.

23. The document scanner of claim 22, wherein the transport mechanism comprises a document transport mechanism for moving the document in a first direction past the optical element.

* * * * *